US011529656B2

(12) United States Patent
Dunfee et al.

(10) Patent No.: US 11,529,656 B2
(45) Date of Patent: Dec. 20, 2022

(54) PROBE WASH STATION FOR ANALYTICAL INSTRUMENTATION

(71) Applicant: Siemens Healthcare Diagnostics Inc., Tarrytown, NY (US)

(72) Inventors: William D. Dunfee, Newark, DE (US); Thomas E. Weitkamp, Newark, DE (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 793 days.

(21) Appl. No.: 16/095,901

(22) PCT Filed: May 10, 2017

(86) PCT No.: PCT/US2017/032018
§ 371 (c)(1),
(2) Date: Oct. 23, 2018

(87) PCT Pub. No.: WO2017/197025
PCT Pub. Date: Nov. 16, 2017

(65) Prior Publication Data
US 2021/0220879 A1    Jul. 22, 2021

Related U.S. Application Data

(60) Provisional application No. 62/334,528, filed on May 11, 2016.

(51) Int. Cl.
*B08B 3/04* (2006.01)
*B08B 9/023* (2006.01)
*G01N 35/10* (2006.01)

(52) U.S. Cl.
CPC .............. *B08B 3/045* (2013.01); *B01L 13/02* (2019.08); *B08B 9/023* (2013.01); *G01N 35/1004* (2013.01)

(58) Field of Classification Search
None
See application file for complete search history.

(56) References Cited

U.S. PATENT DOCUMENTS 4,516,437 A * 5/1985 Pedroso ............ G01N 35/1004
134/21
4,888,998 A * 12/1989 Buzza ............... G01N 35/1004
73/864.21
(Continued)

FOREIGN PATENT DOCUMENTS

CN     102630190 A    8/2012
CN     104024868 A    9/2014
(Continued)

OTHER PUBLICATIONS

Partial supplementary EP Search Report dated Apr. 29, 2019 of corresponding European Application No. 17796795.7, 7 Pages.
(Continued)

*Primary Examiner* — Brian R Gordon

(57) ABSTRACT

A wash station includes a wash nozzle for cleaning an exterior portion of a probe and a basin allowing for waste fluid to be collected. The wash nozzle includes a vertically-elongate cavity with side slits on opposing side portions. A fluid inlet port may be connected to a side portion of the cavity to provide fluid. Fluid may additionally or alternatively come from within the probe. The basin includes an elongate body with an opened end to receive and secure the wash nozzle. One or more access slots may be provided on opposing side portions of the basin. The probe passes through an access slot or over a portion of the basin and through a side slit of the nozzle to enter the cavity for cleaning. A geometry of the cavity allows the wash nozzle to fill to a predetermined level while waste fluid flows out through the side slits.

12 Claims, 12 Drawing Sheets

(56) References Cited

U.S. PATENT DOCUMENTS

| | | | | |
|---|---|---|---|---|
| 5,066,336 | A | * | 11/1991 | Hoffman .............. G01N 35/1004 134/22.12 |
| 5,079,959 | A | * | 1/1992 | Miyake .............. G01N 35/1083 73/864.22 |
| 5,133,373 | A | | 7/1992 | Hoffman et al. |
| 5,186,194 | A | * | 2/1993 | Kitajima ............ G01N 35/1004 134/155 |
| 5,229,074 | A | * | 7/1993 | Heath ................ G01N 35/1004 422/64 |
| 5,279,794 | A | | 1/1994 | Sasao |
| 5,408,891 | A | * | 4/1995 | Barber .............. G01N 35/1004 73/864.22 |
| 5,443,791 | A | * | 8/1995 | Cathcart ............. B01L 3/50825 422/65 |
| 5,603,342 | A | * | 2/1997 | Shambaugh ............. B08B 3/04 134/154 |
| 5,785,068 | A | | 7/1998 | Sasaki et al. |
| 5,827,744 | A | * | 10/1998 | Fose ................... B08B 9/0327 436/49 |
| 5,866,825 | A | * | 2/1999 | Moore ............... G01N 35/1004 73/864.22 |
| 5,896,879 | A | * | 4/1999 | Gross ....................... B08B 9/00 134/182 |
| 6,003,531 | A | * | 12/1999 | Kimura ............. G01N 35/1004 134/155 |
| 6,422,248 | B1 | * | 7/2002 | Furst ........................ B08B 3/02 134/170 |
| 6,475,444 | B1 | * | 11/2002 | Zimmermann ........... B08B 3/04 422/551 |
| 6,575,181 | B1 | * | 6/2003 | Wimmer ................ B01L 13/02 134/182 |
| 7,186,378 | B2 | | 3/2007 | Dunfee |
| 7,621,282 | B2 | * | 11/2009 | Blackwell .......... G01N 35/1004 134/22.1 |
| 9,063,107 | B2 | | 6/2015 | Waterbury et al. |
| 2003/0223472 | A1 | * | 12/2003 | Ravalico ............ G01N 35/1016 374/31 |
| 2005/0074363 | A1 | * | 4/2005 | Dunfee .............. G01N 35/1004 422/81 |
| 2006/0105359 | A1 | * | 5/2006 | Favuzzi ........... G01N 35/00871 435/6.19 |
| 2006/0263250 | A1 | * | 11/2006 | Blouin .................... B01L 13/02 422/63 |
| 2008/0099057 | A1 | * | 5/2008 | Dunfee .............. G01N 35/1004 134/94.1 |
| 2008/0314412 | A1 | * | 12/2008 | Grippo .................. G01N 30/24 422/400 |
| 2009/0114250 | A1 | | 5/2009 | Hayashi et al. |
| 2011/0151504 | A1 | * | 6/2011 | Avantsa ................ G01N 1/312 435/40.5 |
| 2011/0274584 | A1 | | 11/2011 | Kitamura et al. |
| 2011/0293474 | A1 | | 12/2011 | Sugimura et al. |
| 2012/0003731 | A1 | | 1/2012 | Kuroda |
| 2012/0227771 | A1 | * | 9/2012 | Waterbury ......... G01N 35/1004 134/36 |
| 2013/0108521 | A1 | * | 5/2013 | Ikushima ................ B05B 15/55 422/509 |
| 2013/0340795 | A1 | * | 12/2013 | Gaskill-Fox ....... G01N 15/1404 134/26 |
| 2014/0186234 | A1 | * | 7/2014 | Maruyama ......... G01N 35/1004 422/510 |
| 2018/0238922 | A1 | * | 8/2018 | Gebauer ................... B08B 3/00 |
| 2020/0011770 | A1 | * | 1/2020 | Wang ................ G01N 33/1853 |

FOREIGN PATENT DOCUMENTS

| | | |
|---|---|---|
| CN | 105792950 A | 7/2016 |
| EP | 2 025 418 A1 | 2/2009 |
| JP | H05-126836 A | 5/1993 |
| JP | H08-299918 A | 11/1996 |
| JP | H10-062435 A | 3/1998 |
| JP | 2006-126016 A | 5/2006 |
| JP | 2009-042067 A | 2/2009 |
| JP | 2010-127741 A | 6/2010 |
| JP | 2011-257386 A | 12/2011 |
| JP | 2012-008123 A | 1/2012 |
| JP | 2014-055807 A | 3/2014 |

OTHER PUBLICATIONS

PCT International Search Report and Written Opinion dated Sep. 29, 2017 (13 Pages).

* cited by examiner

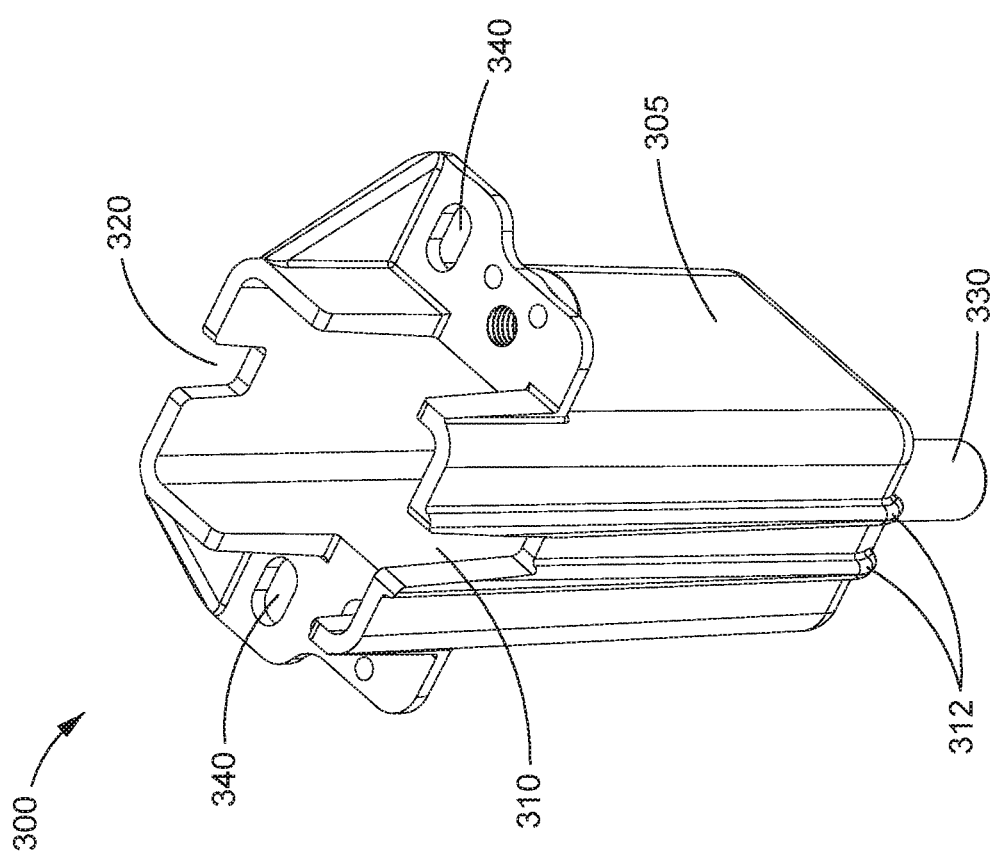

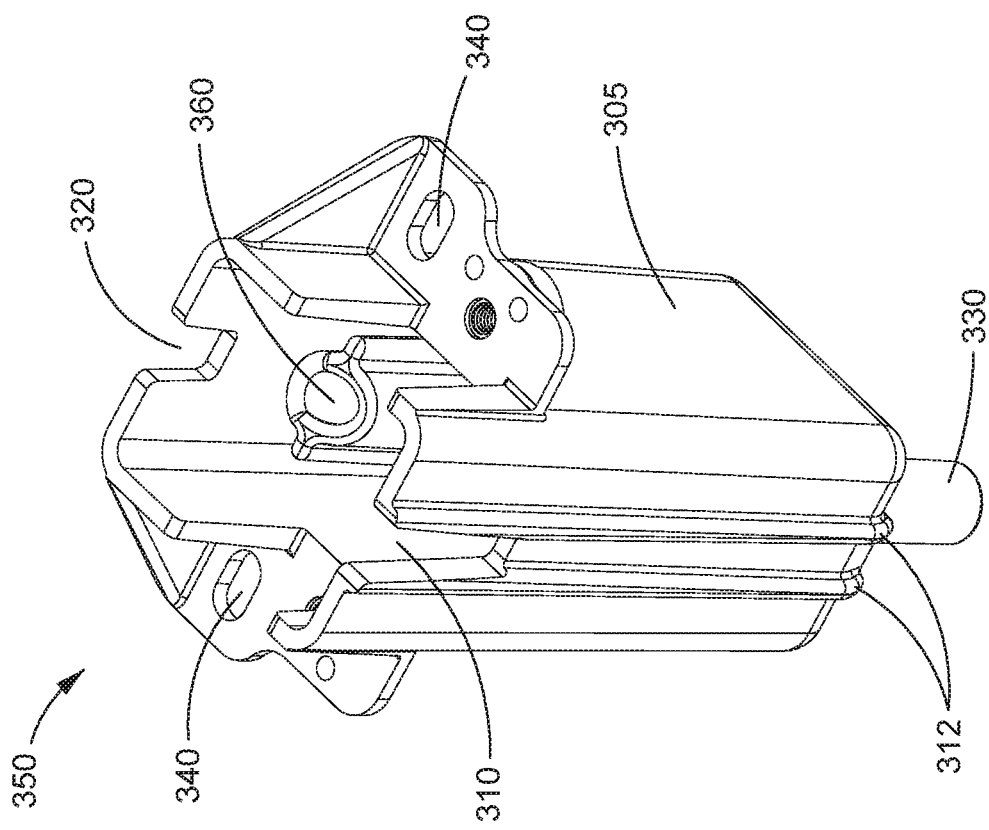

PROBE WASH STATION FOR ANALYTICAL INSTRUMENTATION

CROSS-REFERENCE TO RELATED APPLICATIONS

This application claims priority to U.S. provisional application Ser. No. 62/334,528 filed May 11, 2016, the contents of which is incorporated herein by reference in its entirety.

TECHNOLOGY FIELD

The present invention relates generally to a wash station in an in vitro diagnostics environment and, more particularly, to a wash station for a probe for analytical instrumentation in a clinical analyzer in an in vitro diagnostics environment.

BACKGROUND

Clinical analyzers typically utilize hypodermic needle-like probes to aspirate and dispense fluids, such as patient samples and reagents, transferring the fluids between vessels and containers. For example, probes are used in a clinical analyzer to transfer fluid between a reagent container and a reaction vessel and between a primary patient sample container and a dilution vessel. The probes need to be cleaned between transfers to avoid "carrying over" fluids from one reaction to another. Carryover can lead to incorrect results of a patient test through either unintended introduction of trace amounts of a previously used reagent, or by introduction of analytes that were present in a previously-handled patient sample. Thus, it is important to thoroughly clean the transfer probes between deliveries.

Cleaning of the probes typically requires water, although for some non-water-soluble reagents or for an absolutely thorough removal of patient sample, chemical cleaners may be introduced. The inside of the probe is often rinsed by flowing water at high velocity through the probe, while the outside is rinsed by immersing the probe in flowing water. The water is then removed via a drain to a waste vessel, either by gravity or with a vacuum assist.

Probe exteriors may also often be rinsed mid-transfer (i.e., between the aspiration and dispense) to remove any extra (or unmetered) fluid that adhered to the exterior of the probe while the fluid was aspirated. This prevents the unmetered fluid from being introduced to the destination vessel, which could cause an incorrect or imprecise result of the reaction.

One method to rinse the exterior of the probe involves lowering the probe into a pool (or bath) that flows the water around the probe. Although this method may be thorough, the disadvantage of this approach is that it costs time to lower and raise the probe. Another approach is a fly-through wash station, where the probe moves only horizontally through a fountain of water (i.e., a jet of water ejected essentially upwards, and allowed to fall freely into a basin). The disadvantage with this approach is that the fountain height (and, thus, the amount of probe rinsed by the fountain) is highly sensitive to the pressure or flow rate of the source water and to restrictions to the flow between the source and the fountain. Thus, manual tuning and adjustment of each fountain is required.

Thus, there is a need for an efficient and thorough washing apparatus for a probe in a clinical analyzer.

SUMMARY

Embodiments are directed to a wash station for cleaning an exterior of a probe, while allowing for waste fluid and/or fluid ejected from within the probe to be collected and drained.

According to an embodiment, a wash station for use in a clinical analyzer in an in vitro diagnostics (IVD) environment for cleaning a probe comprises: a wash nozzle comprising a vertically-elongate cavity with opposing side slits on opposing side portions of the vertically-elongate cavity shaped to allow the probe to horizontally pass through; and a basin comprising an elongate body with an opened first end sized to receive and secure the wash nozzle therein. The vertically-elongate cavity is configured to fill with fluid to clean the probe, a geometry of the vertically-elongate cavity allowing the wash nozzle to fill to a predetermined level while waste fluid flows out through the opposing side slits. The basin is configured to capture the waste fluid dispensed by the probe and the wash nozzle.

In an embodiment, the geometry of the vertically-elongate cavity comprises a bottom portion and a top portion, the top portion vertically expanding from a tapered region to a flared region with a top opening at a top end, the bottom portion vertically tapering to a bottom end comprising a bottom opening. In an embodiment, the waste fluid further flows out through the bottom opening.

According to an embodiment, the wash nozzle further comprises a fluid inlet port connected to the vertically-elongate cavity, the fluid inlet port configured to fill the vertically-elongate cavity with the fluid to clean the probe. The fluid inlet port is connected to a first side portion of the vertically-elongate cavity and is located at a point below a nominal level of the probe when inserted through one of the side slits into the vertically-elongate cavity for cleaning.

In an embodiment, the basin further comprises one or more access slots on side portions of the elongate body, each of the one or more access slots corresponding to a respective one of the wash nozzle side slits and shaped to allow the probe to horizontally pass through. In an embodiment, a first of the one or more access slots of the basin is longer than a second of the one or more access slots, wherein the basin further comprises guiding ribs extending outward along a length of either side of the first of the one or more access slots, the guiding ribs configured to guide overflow waste fluid down a side portion of the basin.

In an embodiment, the basin further comprises a drain port configured to drain the waste fluid dispensed by the probe and the wash nozzle, the drain port located at a second end of the elongate body.

The wash nozzle may further comprise, according to an embodiment, ribs extending outward along a length of either side of each of the opposing side slots, the ribs configured to guide the waste fluid dispensed by the probe and the wash nozzle into the basin.

The wash nozzle further comprises, according to an embodiment, a slotted mounting hole configured to adjust a position of the wash nozzle to align the opposing side slits with a path of the probe.

In an embodiment, a ratio of probe diameter to wash nozzle diameter is about 6:1.

In an embodiment, a space below the probe in the vertically-elongate cavity, when the probe is inserted through one of the opposing side slits, is sized to allow for the probe to be vertically lowered.

According to an embodiment, the wash station is mounted on a baseplate of the clinical analyzer.

The basin further comprises, in an embodiment, a probe cleaner port disposed therein for holding a wash solution.

According to another embodiment, a wash station for use in a clinical analyzer in an in vitro diagnostics (IVD) environment for cleaning a probe comprises: a wash nozzle comprising: a vertically-elongate cavity comprising a bottom portion and a top portion, the top portion vertically expanding from a tapered region to a flared region with a top opening at a top end, the bottom portion vertically tapering to a bottom end comprising a bottom opening; a fluid inlet port connected to a first side portion of the vertically-elongate cavity, the fluid inlet port configured to fill the vertically-elongate cavity with fluid; and side slits on opposing side portions of the vertically-elongate cavity, each of the side slits shaped to allow the probe to horizontally pass through. The fluid inlet port is located at a point below a nominal level of the probe when inserted through one of the side slits into the vertically-elongate cavity for cleaning. The wash station further comprises a basin comprising: an elongate body with an opened first end sized to receive and secure the wash nozzle therein and configured to capture waste fluid dispensed by the probe and the wash nozzle; access slots on opposing side portions of the elongate body, corresponding to respective ones of the wash nozzle side slits, each of the access slots shaped to allow the probe to horizontally pass through; and a drain port configured to drain the waste fluid dispensed by the probe and the wash nozzle.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIGS. 9A and 9B are perspective views of a basin, according to embodiments; and

DETAILED DESCRIPTION

Embodiments are directed to a wash station comprising a wash nozzle for providing a fluid (e.g., water) source to clean an exterior portion of a probe, and a basin allowing for waste fluid and fluid ejected from within the probe to be collected and drained. Advantageously, the wash station provides for the probe to be rinsed without requiring any vertical movement of the probe, although the wash station can also accommodate for a vertical motion to be able to rinse a higher portion on the probe (for example, for an occasional deep clean such as during a routine maintenance or as part of an error recovery process).

According to embodiments, the wash station provided herein can be used in a clinical analyzer in an in vitro diagnostics environment (IVD), for example, although it is not limited to such an environment.

Figure 1:
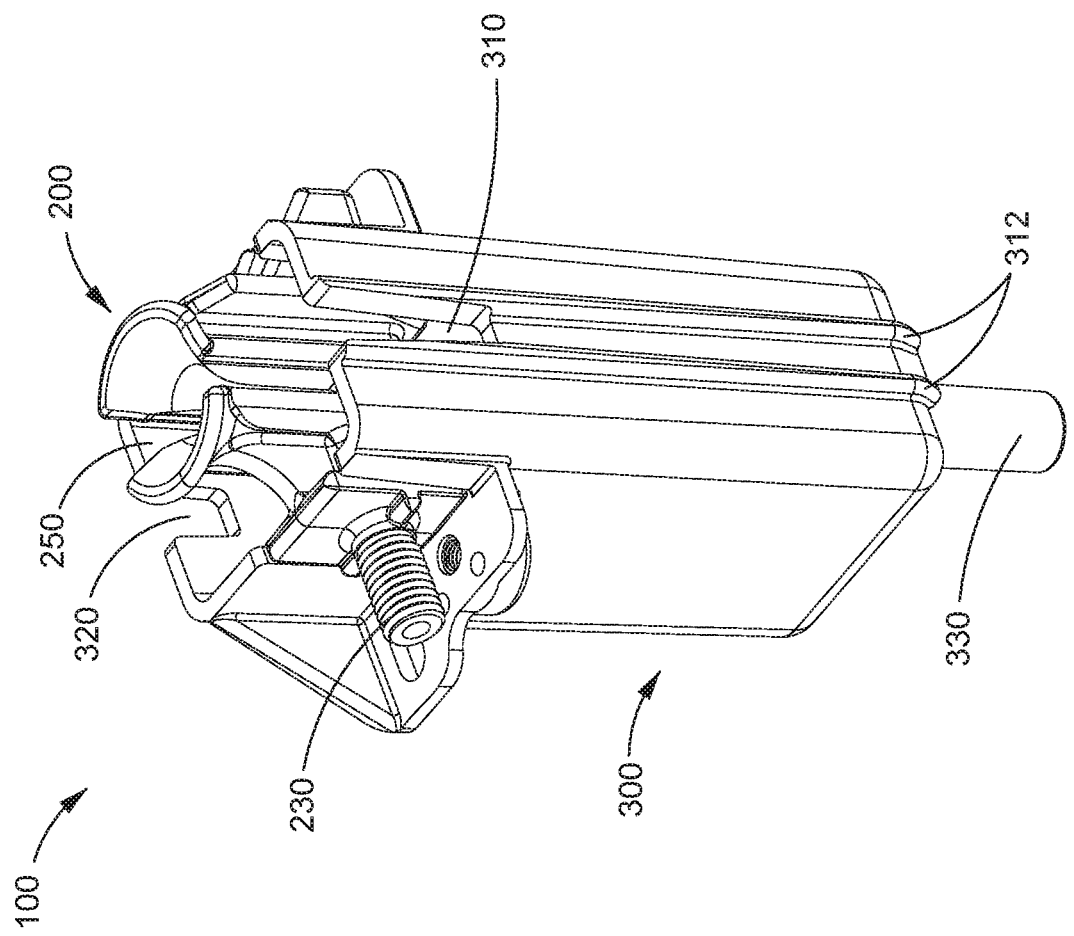
FIG. 1 is a perspective view of a wash station, according to an embodiment.
Figure 2:
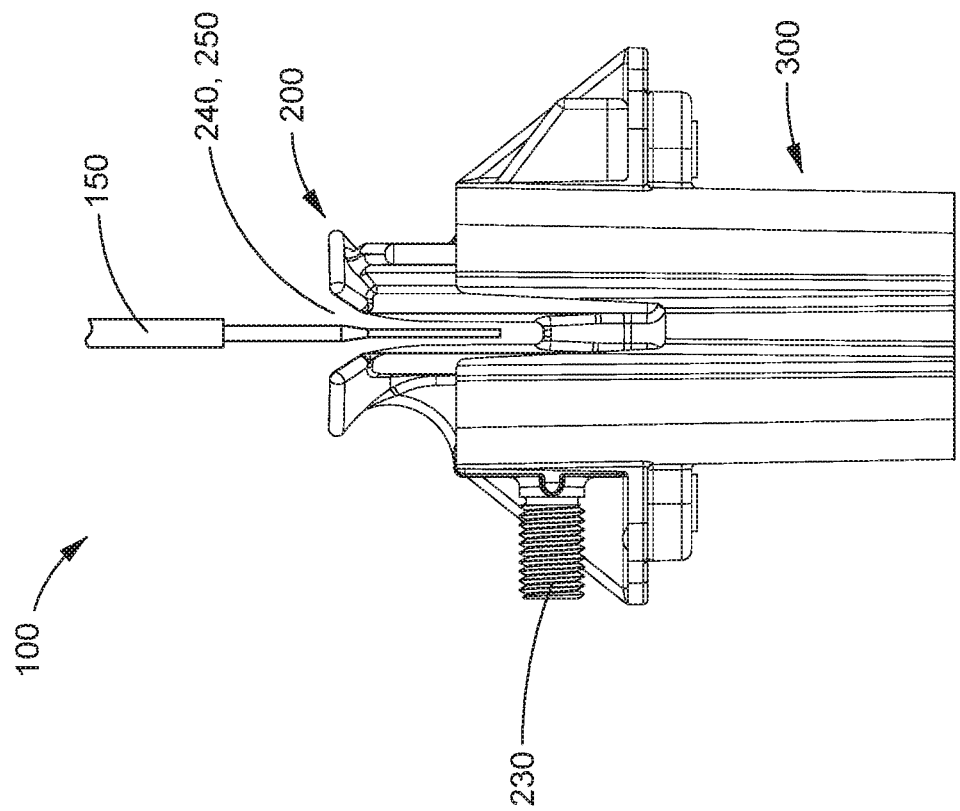
FIG. 2 is a side view of a wash station, according to an embodiment.
Figure 3:
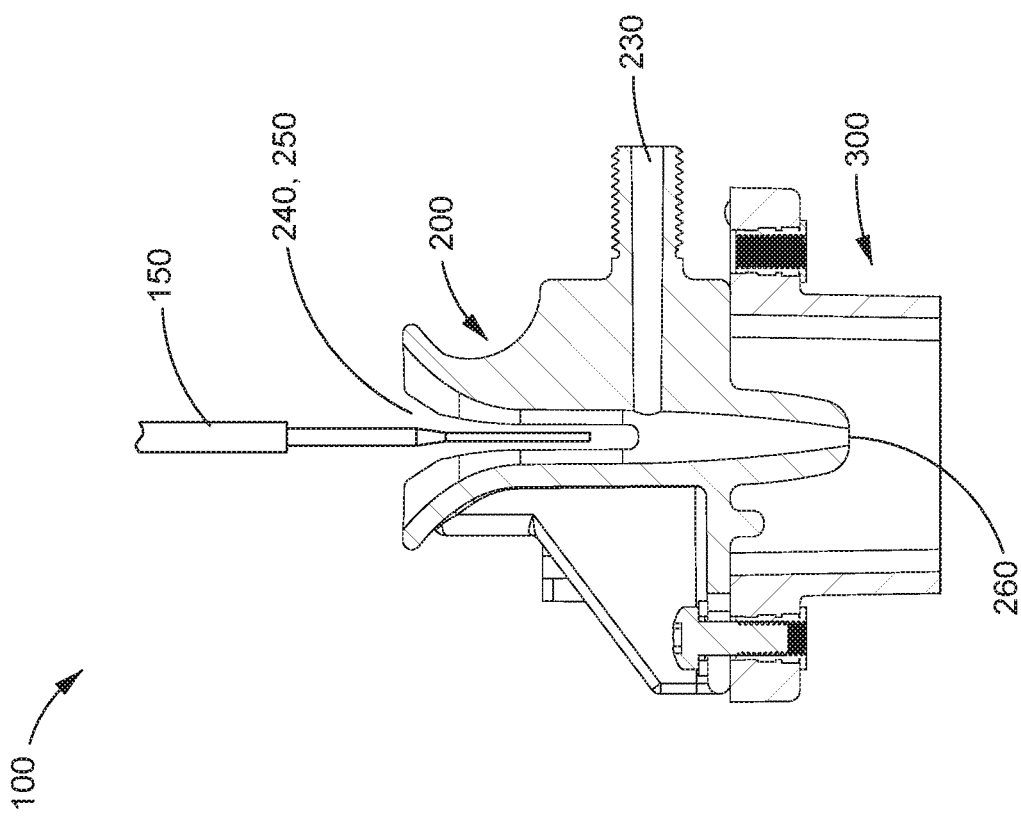
FIG. 3 is a cross-sectional side view of a wash station, according to an embodiment.

According to an embodiment, FIG. 1 provides a perspective view of a wash station 100; FIG. 2 a side view; FIG. 3 a cross-sectional side view; and FIG. 4 a top view. The wash station 100 includes a wash nozzle 200 and a basin 300. A probe 150 is inserted into the nozzle 200 for cleaning. The basin 300 is sized to receive and secure the wash nozzle 200 therein to capture waste fluid dispensed by the probe 150 and the wash nozzle 200.

Figure 5:
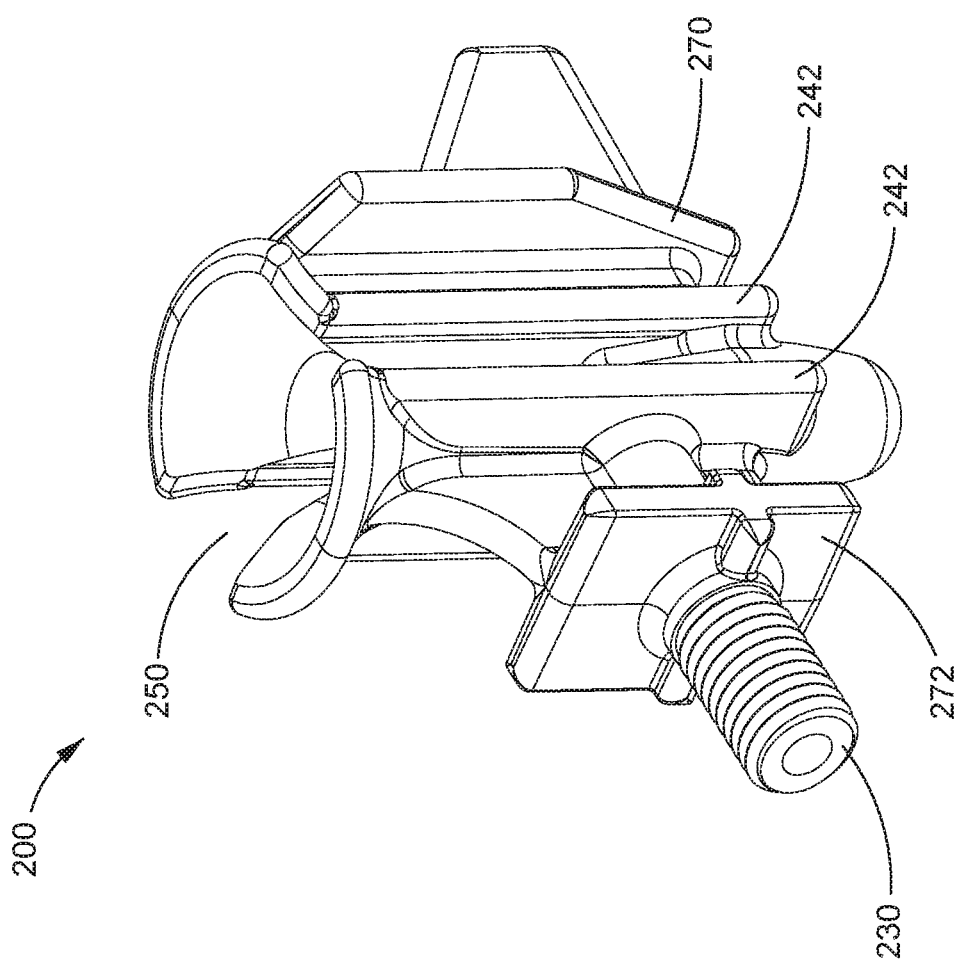
FIG. 5 is a perspective view of a wash nozzle, according to an embodiment.
Figure 6:
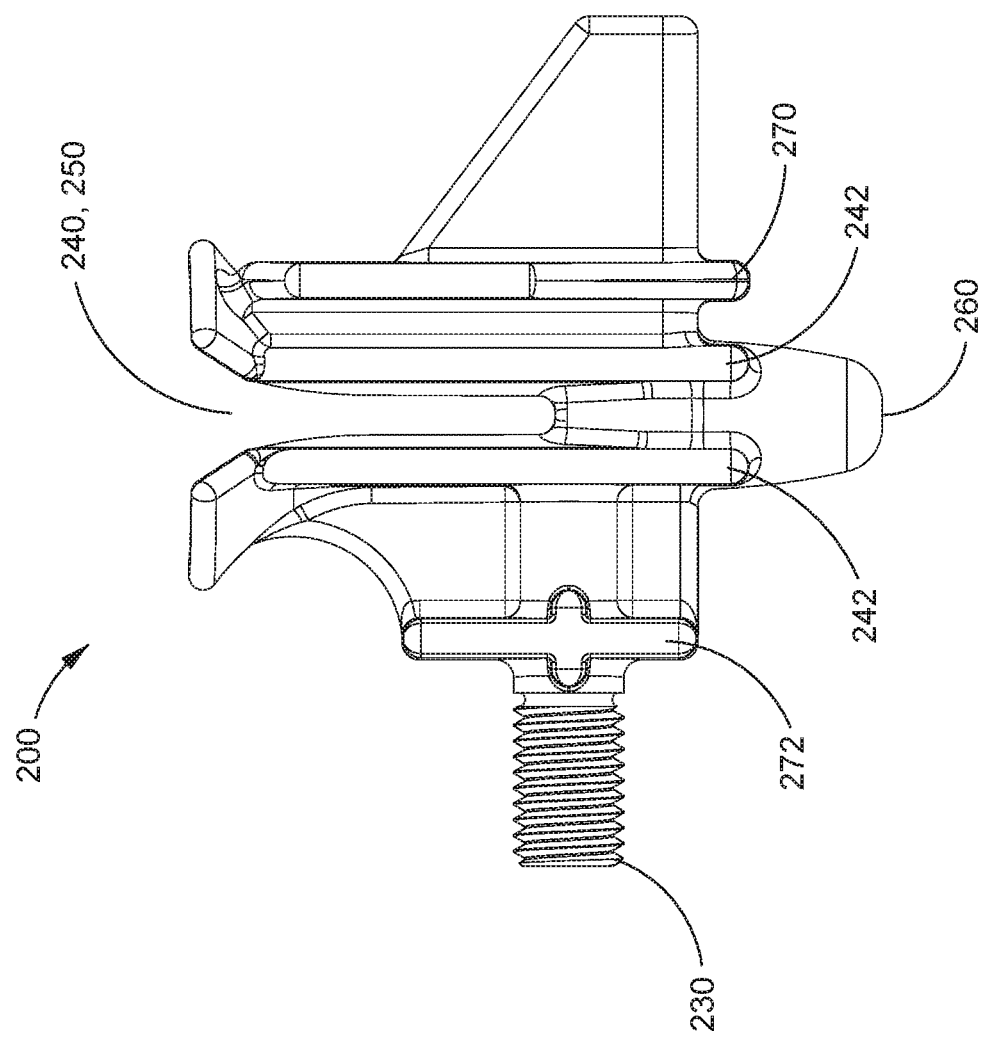
FIG. 6 is a side view of a wash nozzle, according to an embodiment.

With reference to FIGS. 5-8, details of the wash nozzle 200 are provided. FIG. 5 is a perspective view of a wash nozzle; FIG. 6 a side view; FIGS. 7A and 7B perspective cross-sectional views; and FIG. 8 a top view.

The wash nozzle 200 includes a vertically-elongate cavity 205 comprising a bottom portion 220 and a top portion 210. The top portion 210 vertically expands from a tapered region 212 to a flared region 214 with a top opening at a top end of the flared region 214. In an embodiment, the flared region 214 is comprised of two flared regions: a first flared region 216 and a second flared region 218. In an embodiment, the flared region 214 is one continuous surface. In an embodiment, the cross section of the top portion 210 expands vertically upward along the cavity 205. The bottom portion 220 vertically tapers to a bottom end with a bottom opening 260. In an embodiment, the bottom portion 220 vertically tapers to a flat or substantially flat bottom end surface, and the bottom opening 260 is an aperture or hole within this surface.

On opposing side portions of the cavity 205 are side slits 240 and 250, each shaped to allow the probe 150 to horizontally pass through to enter and leave the nozzle 200.

According to an embodiment, a fluid inlet port 230 is connected to a side portion of the vertically-elongate cavity 205. The side portion to which the fluid inlet port 230 is connected is, according to an embodiment, adjacent or substantially adjacent the opposing side portions with which the side slits 240, 250 are located. In an embodiment, the fluid inlet port 230 is positioned an equal or near equal distance between the side slits 240, 250. According to an embodiment, the fluid inlet port 230 is perpendicular or substantially perpendicular to vertical length of the nozzle 200 and the nozzle cavity 205. In an embodiment, the fluid inlet port 230 is configured to fill the cavity 205 with fluid. The fluid inlet port 230 is located at a point below a nominal level of the probe 150 when inserted through one of the side slits 240, 250 into the cavity 205 for cleaning.

In another embodiment, fluid can additionally or alternatively enter the cavity 205 through the probe 150 as it performs an internal rinse. In an embodiment, the nozzle 200 does not include a fluid inlet port, and the fluid to wash the probe 150 is supplied from within the probe 150 itself.

In other embodiments, the fluid intake port 230 may be located at alternate locations, such as at a non-perpendicular angle with respect to the length of the cavity 205, or may be directed upward or primarily upward from a bottom location.

Figure 4:
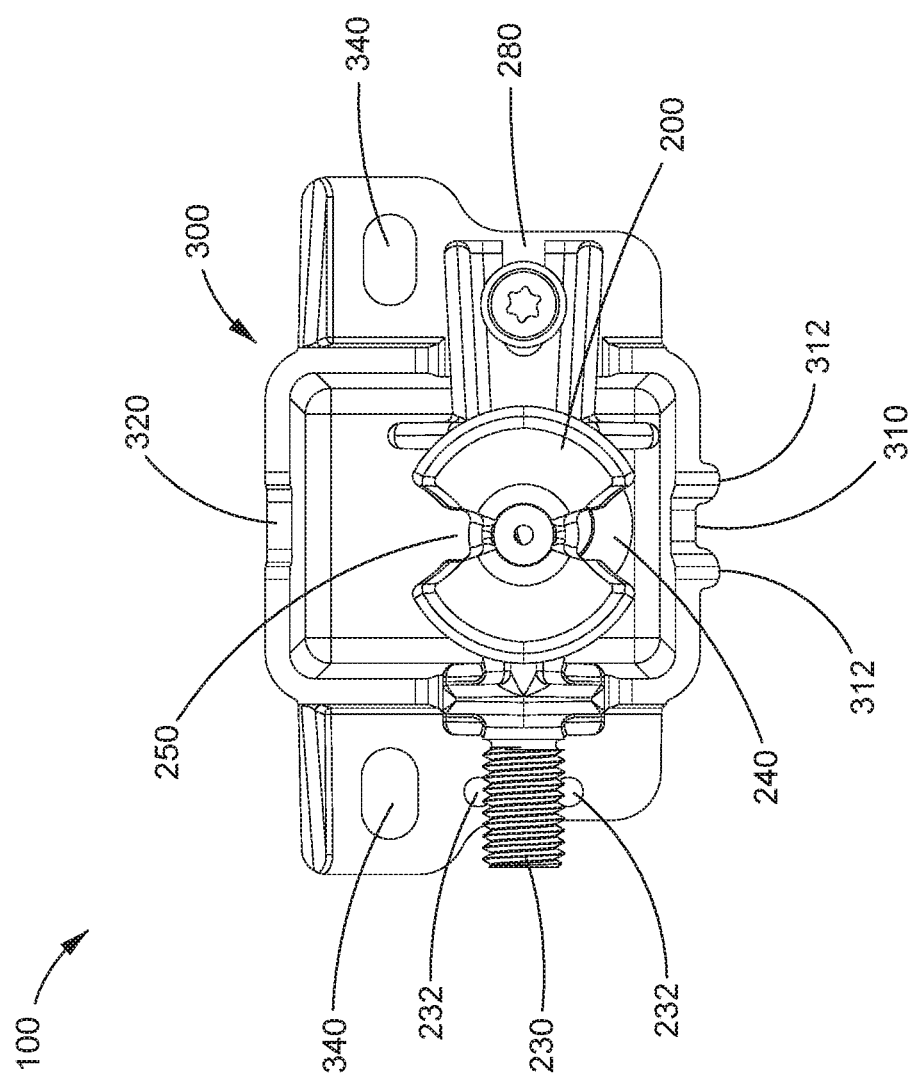
FIG. 4 is a top view of a wash station, according to an embodiment.
Figure 8:
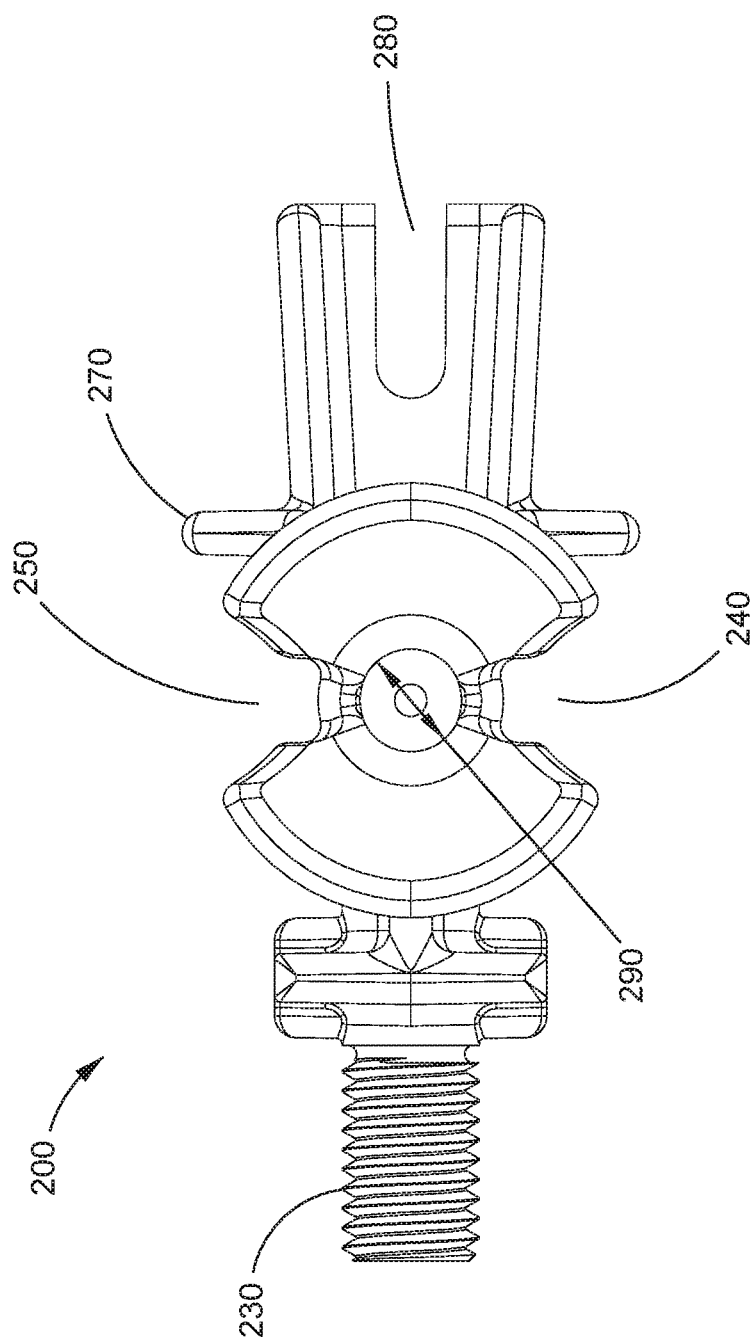
FIG. 8 is a top view of a wash nozzle, according to an embodiment.

The position of the nozzle 200 within the basin 300 is adjustable by utilizing a slotted mounting hole 280 to center the nozzle side slits 240, 250 on the path of the probe 150 (see FIGS. 4 and 8). Raised pads 232 on either side of the fluid inlet port 230 may be provided to secure the nozzle 200 in place, to resist motion of the nozzle 200 in the direction of travel of the probe 150 (see FIG. 4).

Fluid supply tubing may be connected to the fluid inlet port 230 by, for example, a threaded connection that mates with an appropriate fitting.

Figure 7A:
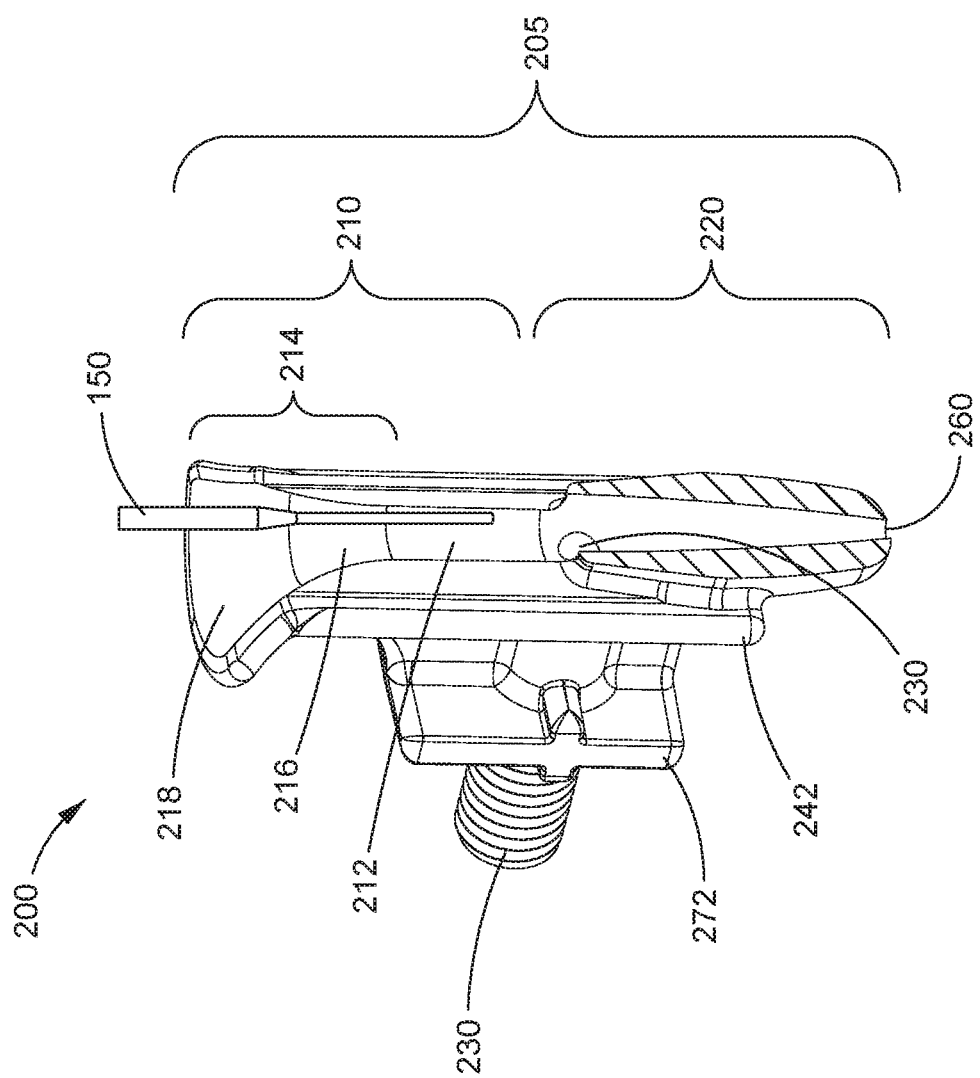
FIGS. 7A and 7B are perspective cross-sectional views of a wash nozzle, according to an embodiment.
Figure 7B:
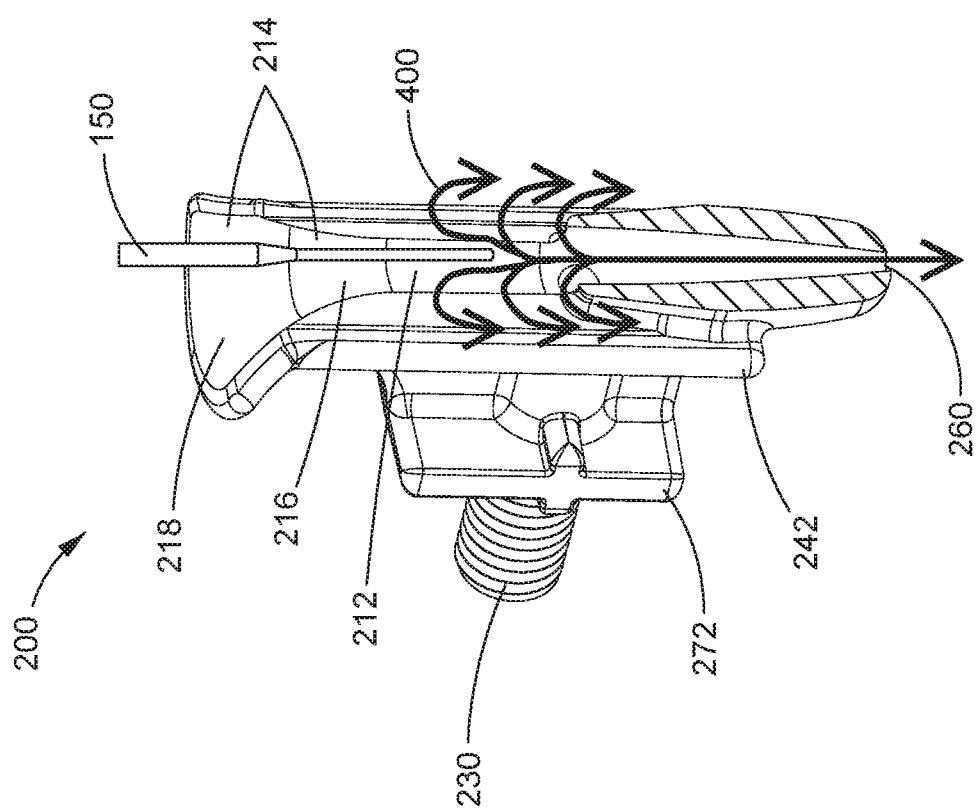

In normal operation, according to one embodiment, the nozzle fluid supply is activated, filling the cavity 205 of the nozzle 200 with fluid via the fluid inlet port 230. The internal geometry of the cavity 205 (i.e., the top portion 210 vertically expanding from the tapered region 212 to the flared region 214 with a top opening, and the bottom portion 220 vertically tapering to the bottom end with an opening 260) allows the nozzle 200 to fill to a predetermined level while fluid flows out of the nozzle 200, primarily through the side slits 240, 250 and to a lesser extent the bottom opening 260. If fluid flow increases, the combination of the expanding cross section of the top portion 210 (moving vertically upward along the cavity 205) and the side slits 240, 250 prevents the fluid height from changing appreciably. As the fluid height incrementally increases, significantly more volume is required to fill the expanded cavity 205, and the volume of the fluid exiting the drain slits 240, 250 increases. This combination makes the fluid level stable across a wide range of flow rates. In fact, even when the flow rate is nearly doubled by the addition of fluid flow through the probe 150, the fluid level changes only incrementally. Therefore, the area of the probe 150 being washed by the fluid in the nozzle 200 is very consistent, with no flow adjustments required. FIGS. 7A and 7B depict the fluid flow paths 400 exiting the nozzle 200.

The bottom opening 260 of the cavity 205 of the nozzle 200 allows for some of the waste fluid to drain during operation (i.e., while fluid is flowing into the cavity 205 for cleaning) and for any remaining fluid to drain after the fluid flow is stopped. The bottom opening 260 of the cavity 205 may vary in size depending on the application or desired characteristics. In an embodiment, a bottom opening 260 is not provided.

Additionally, when washing is complete and the fluid supply turned off, the waste fluid drains from the nozzle 200 in a controlled fashion, with the fluid level lowering, falling below the tip of the probe 150. This consistent draining, again a function of the internal geometry, has the benefit of using surface tension to dry the probe 150: the fluid recedes at a rate slow enough to prevent a significant film from remaining on the outside of the probe 150, but fast enough not to have a significant impact on cycle time (the drying process takes under 100 ms). Thus, no additional steps are required to dry the probe 150. Once the fluid level recedes below the level of the tip of the probe 150, the probe 150 may exit the nozzle 200 in a dry state.

With reference to the top view in FIG. 8, a central diameter 290 of the cavity 205 is illustrated. The central diameter 290 is critical to performance of the wash station 100 for drying the probe 150; specifically, the size of the gap between the outer diameter of the probe 150 and the sidewall within the nozzle (i.e., the sidewall of the cavity 205). If the nominal gap is too small, fluid, as it recedes, can "bridge" between the probe 150 and the sidewall, preventing drying. Surface tension of the fluid allows this bridging to occur. The bridging fluid can then cling to the probe 150 as it exits the nozzle 200, resulting in carryover or dilution in the next container accessed. This bridging phenomenon can occur at gaps of about 1 mm. Gaps of about 2 mm have been shown to be ideal. In this embodiment, the 2 mm gap results in about a 6:1 ratio of probe diameter to nozzle diameter. Increasing the nozzle diameter further, although still solving the bridging problem, also produces the negative effect of increasing the total volume within the nozzle 200. Larger nozzle volumes require higher flow rates and fluid consumption to fill the nozzle 200, and also increase the total time for the fluid to drain from the nozzle, which increases total probe transfer cycle time.

As shown in FIG. 3, there is a significant amount of space below the probe 150 within the cavity 205 in the normal washing configuration. This allows for the probe 150 to be able to descend vertically into the nozzle 200 to wash to a higher position on the probe 150. This is a useful feature for automated daily maintenance or upon error recovery, where additional washing is desirable but not constrained by the cycle time/throughput needs of the analyzer.

According to an embodiment, ribs 242 extend outward along the length of the slits 240, 250 to serve to guide the fluid downwards into the basin 300. Additional ribs 270 and/or 272 may be provided, according to an embodiment, for additional protection against fluid moving horizontally across the external surface of the nozzle 200 due to surface tension effects, for example.

In an embodiment, the material of the nozzle 200 is high-density polyethylene, which has two main benefits. First, high-density polyethylene is compatible with a wide range of chemicals, as the nozzle 200 will potentially be in contact with hundreds of reagents and cleaning solutions. Secondly, high-density polyethylene is somewhat hydrophilic, which is a significant benefit in having a controlled flow through the nozzle 200 and during the drying process as the fluid "adheres" to the sidewalls of the cavity 205. Hydrophobic materials tend to cause the fluid to repel from the sidewalls, causing inconsistent behavior. Other materials may be used, depending on the environment and other factors.

According to an embodiment, the nozzle 200 is of one-piece injection molded construction, and thus has very low manufacturing costs.

A computational fluid dynamics analysis performed on the nozzle 200 predicts that one or more air bubbles may be entrained in the flow when both the nozzle 200 and probe 150 are flowing. The presence of the air bubbles was confirmed with high speed video. The bubbles have no impact on nozzle function. However, when the probe flow is discontinued, inertial forces cause the fluid column to spring back into the probe 150, causing a small aspiration of fluid from the nozzle 200. If a bubble gets aspirated, then a larger than desired air gap will result in the probe 150. Thus, according to an embodiment, a compensating dispense may be used after the internal rinse to push undesired air back out of the probe 150 prior to the commencement of metering operations.

FIG. 9A is a perspective view of the basin 300, according to an embodiment. The basin is comprised of an elongate body 305 with an opened first end sized to receive and secure the wash nozzle 200 therein and configured to capture the fluid dispensed by the probe 150 and the wash nozzle 200. The basin 300 also includes a drain port 330 at a bottom portion of the body 305 to drain the fluid dispensed by the probe 150 and the wash nozzle 200 to a waste system or the like.

According to an embodiment, one or more access slots 310 and/or 320 may be provided on opposing side portions of the body 305. The access slots 310 and 320 are each shaped to allow the probe 150 to horizontally pass through to enter and leave the basin 300 and the wash nozzle 200. In an embodiment, the access slots 310, 320 correspond to respective ones of the wash nozzle side slits 240, 250. In an embodiment, one of the access slots (for example, the access slot 310) extends lower than the other access slot. According to an embodiment, this is an overflow port, allowing fluid to be directed to a known location if the basin 300 (i.e., the body 305) becomes clogged and/or overfilled. In an embodiment, ribs 312 extend outward along the length of the access slot 310 and continue along outer side portions of the basin 300, to serve to guide the overflow fluid down the side of the basin 300 into a drip pan, or the like. Thus, any overflow conditions are controlled.

In another embodiment, the basin 300 does not include access slots. For example, in an embodiment, a basin may have lower side walls, thus not requiring the access slots for the probe 150. In this embodiment, the probe 150 horizontally passes over a top portion of the basin 300 (i.e., over a portion of the opened first end of the basin 300) to enter and leave the wash nozzle 200. In an additional embodiment, the basin 300 includes just one access slot 310 or 320 which corresponds to one of the wash nozzle side slits 240 or 250.

In an embodiment, the basin 300 mounts to a baseplate of an instrument (e.g., a clinical analyzer) via two (or more) slots 340. The slots 340 allow for adjustment of the basin 300 to center the access slots 310, 320 on the path of the probe 150.

In an embodiment, the material of the basin 300 is high-density polyethylene, desirable for its compatibility with a wide range of chemicals. Other materials may be used, depending on the environment and other factors.

According to an embodiment, the basin 300 is of one-piece injection molded construction, and thus has very low manufacturing costs.

FIG. 9B is a perspective view of a basin 350, according to an additional embodiment. According to an embodiment, the basin 350 includes a probe cleaner port 360. For example, a wash station utilized for a dilution probe may require such a port 360, which may be filled and overflow into the elongate body 305 of the basin 350. In other aspects, the basin 350 is equivalent to the basin 300.

The wash station 100, according to various embodiments herein, has several advantages, including reduced sensitivity to fluid supply variations (for more consistent washing), low cost, easy setup and alignment, and the capability for the probe 150 to either "fly-through" with no vertical movement or to descend deeper for a more thorough (higher) clean. As described herein, the geometry of the nozzle 200 allows for control of the wash column height and consistent drain-off, and keeps the height stable over a relatively wide range of supply pressures and flow rates. The geometry also provides room for the probe 150 to optionally descend for additional cleaning. Additionally, the wash station 100 results in lower service costs due to its easy setup and requires no need for readjustment as the fluid source changes over time.

Figure 10:
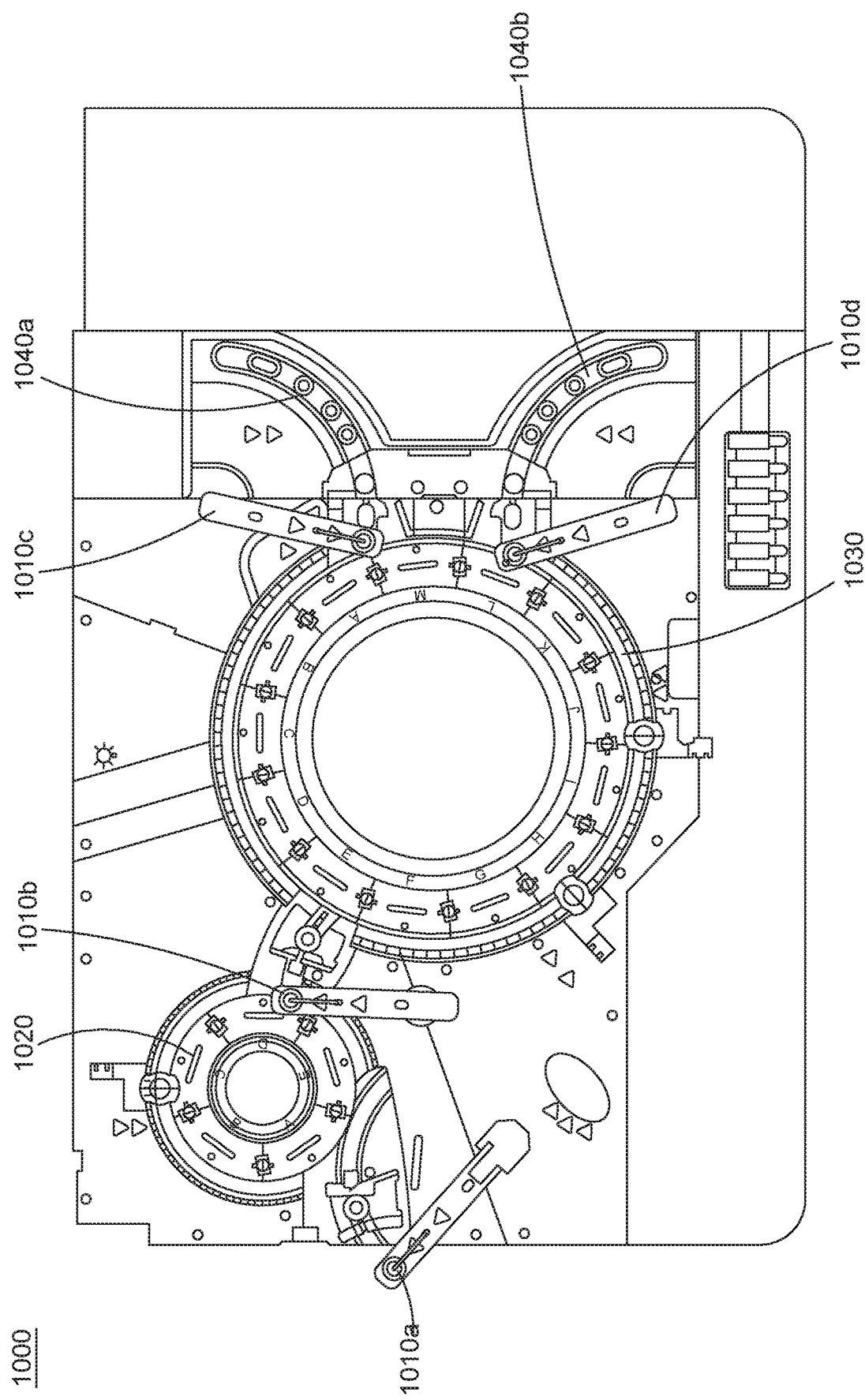
FIG. 10 is a layout of an example system architecture within which embodiments of the invention may be implemented, according to an embodiment.

FIG. 10 provides a layout of an example system architecture 1000 within which embodiments of the invention may be implemented, according to an embodiment. Shown in FIG. 10 are various transfer arms 1010 (1010a, 1010b, 1010c, and 1010d) with respective probes (such as the probe 150 described above with respect to the wash station 100); a diluting turntable 1020 including a plurality of diluting containers arranged in one or more diluting rings; a reaction turntable 1030 including a plurality of reaction containers arranged in one or more reaction rings; and reagent storage areas 1040a and 1040b dedicated to storage and supply of a respective reagent, each reagent storage area 1040a and 1040b including a plurality of reagent containers. In operation, transfer arm 1010a and its respective probe may operate to transfer sample from an access position to one or more diluting containers on the diluting turntable 1020 to create a dilution therein. Transfer arm 1010b and its respective probe may operate to transfer dilution from a diluting container to a reaction container on the reaction turntable 1030. Transfer arms 1010c and 1010d and their respective probes may operate to transfer a reagent from reagent storage area 1040a and 1040b, respectively, to a reaction container on the reaction turntable 1030. The various transfers occur by use of a pumping mechanism, such as a displacement pump, for example, attached to the transfer arms 1010. Additionally, the system architecture 1000 includes one or more controllers (not shown) for controlling operation of the various components, including the transfer arms 1010, the probes, and the turntables.

According to an embodiment, one or more wash stations 100 are mounted to the baseplate of the architecture 1000, in locations where the probes can be reached via their respective transfer arm 1010. The system architecture 1000 of FIG. 10 and the accompanying description are purely exemplary and non-limiting to the wash station disclosed herein. The system architecture 1000 is just one example system in which the wash station according to embodiments herein may be implemented.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A wash station comprising:
 a wash nozzle comprising a vertically-elongate cavity comprising a first side slit and a second side slit, wherein each of the first side slit and the second side slit have a lowermost point, wherein the first side slit is located substantially 180° from the second side slit measured from a center point of a horizontal cross-section of the wash nozzle;
 a fluid inlet port comprising an inlet end and an outlet end, wherein the outlet end is connected to a first side portion of the vertically-elongate cavity, wherein the fluid inlet port is structurally capable of receiving a fluid at the inlet end and discharging the fluid at the outlet end to the wash nozzle;
 a basin comprising an elongate body with an opened first end sized to receive and secure the wash nozzle therein, wherein the basin is secured to the wash nozzle at the opened first end;
 wherein the vertically-elongate cavity is structurally capable of being selectively filled via the fluid inlet port with the fluid to a predetermined level within the vertically-elongate cavity, and while being filled simultaneously:
 receiving the fluid from the fluid inlet port,
 maintaining the fluid at the predetermined level within the vertically-elongate cavity, and
 discharging the fluid through the first side slit and the second side slit, wherein the fluid discharged is exiting fluid, wherein the predetermined level is above the lowermost point of the first side slit; and wherein the basin is structurally capable of capturing the exiting fluid.

2. The wash station of claim 1, wherein the vertically-elongate cavity comprises a bottom portion and a top portion, the top portion vertically expanding from a tapered region to a flared region with a top opening at a top end, the bottom portion vertically tapering to a bottom end comprising a bottom opening, wherein the exiting fluid further flows out through the bottom opening, wherein the fluid inlet port is located at a point above the bottom opening.

3. The wash station of claim 1, wherein the vertically-elongate cavity comprises an uppermost point and a lowermost point, wherein the fluid inlet port is located at a point below the uppermost point and above the lowermost point of the vertically-elongate cavity.

4. The wash station of claim 1, wherein the elongate body of the basin further comprises a first access slot and a second access slot, wherein the first access slot, the second access slot, the first side slit, and the second side slit are arranged linearly along a horizontal plane.

5. The wash station of claim 4, wherein the first access slot of the basin is longer than the second access slot, wherein the basin further comprises a plurality of guiding ribs extending outwardly from the basin, wherein each of the plurality of guiding ribs is located along either the first access slot or the second access slot, wherein the guiding ribs are structurally capable of guiding overflowing exiting fluid down a side portion of the basin.

6. The wash station of claim 1, wherein the basin further comprises a drain port structurally capable of draining the exiting fluid discharged by the wash nozzle, the drain port located at a second end of the elongate body.

7. The wash station of claim 1, wherein the wash nozzle further comprises ribs extending outwardly from the wash nozzle, wherein each of the ribs is located along either the first side slit or the second side slit, wherein the ribs are structurally capable of guiding the exiting fluid discharged from the wash nozzle into the basin.

8. The wash station of claim 1, wherein the wash nozzle further comprises a slotted mounting hole structurally capable of receiving a fastener and securing the wash nozzle to the basin.

9. The wash station of claim 1, wherein a ratio of probe diameter to wash nozzle diameter is about 6:1.

10. The wash station of claim 1, wherein a space in the vertically-elongate cavity beneath the first side slit is sized to allow for a probe to be inserted through the first side slit and vertically lowered into the space.

11. The wash station of claim 1, wherein the wash station is structurally capable of being mounted on a baseplate of a clinical analyzer.

12. The wash station of claim 1, wherein the basin further comprises a probe cleaner port in the basin for holding a wash solution.

* * * * *